US012640965B2

(12) United States Patent
Yang et al.

(10) Patent No.: US 12,640,965 B2
(45) Date of Patent: May 26, 2026

(54) DIGITAL SERIALIZER/DESERIALIZER CIRCUIT AND DATA EYE MONITORING METHOD THEREOF

(71) Applicant: MEDIATEK INC., Hsinchu City (TW)

(72) Inventors: Ting-Ming Yang, Hsinchu City (TW); Bi-Jing Juang, Hsinchu City (TW); Wei-Ping Yen, Hsinchu City (TW); Chia-Sheng Peng, Hsinchu City (TW); Tse-Hsien Yeh, Hsinchu City (TW)

(73) Assignee: MEDIATEK INC., Hsinchu City (TW)

( * ) Notice: Subject to any disclaimer, the term of this patent is extended or adjusted under 35 U.S.C. 154(b) by 0 days.

(21) Appl. No.: 18/890,839

(22) Filed: Sep. 20, 2024

(65) Prior Publication Data

US 2025/0097080 A1     Mar. 20, 2025

Related U.S. Application Data

(60) Provisional application No. 63/583,873, filed on Sep. 20, 2023.

(51) Int. Cl.
| | |
|---|---|
| *H03H 7/30* | (2006.01) |
| *H04L 25/03* | (2006.01) |
| *H04L 25/49* | (2006.01) |

(52) U.S. Cl.
CPC ........ *H04L 25/03057* (2013.01); *H04L 25/49* (2013.01)

(58) Field of Classification Search
CPC .......................... H04L 25/03057; H04L 25/49
USPC ................................ 375/233, 219, 295, 316
See application file for complete search history.

(56) References Cited

U.S. PATENT DOCUMENTS

| | | | |
|---|---|---|---|
| 9,800,438 B1 | 10/2017 | Zhang | |
| 10,749,661 B1 * | 8/2020 | Visani | H04L 1/205 |
| 10,992,501 B1 | 4/2021 | Sun | |
| 2014/0064352 A1 * | 3/2014 | Zhong | H04L 25/03076 |
| | | | 375/232 |
| 2024/0187012 A1 * | 6/2024 | Camponeschi | H03M 1/188 |

* cited by examiner

*Primary Examiner* — Zewdu A Kassa
(74) *Attorney, Agent, or Firm* — McClure, Qualey & Rodack, LLP

(57) ABSTRACT

The application disclose a digital serializer/deserializer circuit and a data eye monitoring method thereof. A received analog signal is converted to first digital samples at a first sample rate. The first digital samples are equalized to generate a first equalized signal. A symbol decision signal is generated from the first equalized signal. The received analog signal is converted to second digital samples at a second sample rate. Difference between the first digital samples and the second digital samples is determined, and the first equalized signal and the determined difference are combined to generate a signal processing output. A data eye error rate is determined according to the symbol decision signal and the signal processing output.

19 Claims, 10 Drawing Sheets

100

DIGITAL SERIALIZER/DESERIALIZER CIRCUIT AND DATA EYE MONITORING METHOD THEREOF

CROSS-REFERENCE TO RELATED ART

This application claims the benefit of U.S. provisional patent application Ser. No. 63/583,873, filed 2023 Sep. 20, the disclosure of which is incorporated by reference herein in its entirety.

TECHNICAL FIELD

The disclosure relates in general to digital serializer/deserializer circuit and data eye monitoring method thereof.

BACKGROUND

A "data eye" is a plot generated when a receiver's digital signal is repetitively sampled, with the signal amplitude representing the vertical axis and the data rate (time) representing the horizontal axis. This pattern often resembles a series of eyes for certain signal types. The eye pattern reveals the state of the signal, along with the impacts of channel noise and inter-symbol interference. A high-quality signal with minimal noise features a well-defined eye, characterized by clear, empty spaces surrounded by multiple signal traces. Conversely, a low-quality signal with significant noise shows a poorly defined eye, with signal traces encroaching into the central empty space.

In SerDes (serializer/deserializer) systems used for serial communication between and within integrated circuit devices, data eye monitoring (also known as "eye opening monitoring" or EOM) measures signal quality or error rate. In an analog SerDes system's data path, the analog data is sampled and compared to a threshold to generate data signals. Eye monitoring is achieved by duplicating the sampling and threshold (or "slicing") circuit in a parallel signal path. This parallel path samples data at various points and thresholds, different from those used in the main data path, to determine the eye's shape. The EOM error rate is calculated by comparing the parallel monitoring path's output with the data path's output.

In a digital SerDes system, which relies on an analog-to-digital converter (ADC), EOM is conducted similarly to analog systems. However, known digital EOM systems are often "destructive" (i.e., the monitoring affects the data signal) because less than the full signal path is usually replicated. Fully replicating the digital receiver path for EOM, while non-destructive, significantly impacts device area, power consumption, and performance due to the inclusion of digital signal processing circuit, including filters, in an ADC-based digital SerDes.

To ascertain link health, many high-speed interface (e.g. PCIe, USB, etc.) added a feature formally called "Lane Margining" by evaluating the receiver time and voltage margin. This feature measures the signal eye width (time) and the signal eye height (voltage) without impacting the live traffic going through the Link. Eye height refers to the height of the target bit error rate contour at the average clock time, and eye width refers to the width of the eye measured at the threshold crossing.

For ADC-based receiver, a non-destructive eye monitor has significant impacts on device area, power consumption and performance, because an ADC-based digital SerDes includes digital signal processing circuit, including filters.

Thus, a new eye monitor method/circuit is required to reduce the cost and simultaneously provide a noticeable trend to the transmitter signal quality adjusted (e.g., transmitter (Tx) finite impulse response (FIR), channel loss, Tx jitter).

SUMMARY

According to one embodiment, a digital serializer/deserializer circuit for a communication receiver is provided. The digital serializer/deserializer circuit includes: a data path and a data eye monitoring path. The data path includes: a first analog-to-digital converter (ADC), configured to convert a received analog signal to first digital samples at a first sample rate; a first signal processing stage coupled to the first ADC, the first signal processing stage including an equalizer coupled to the first ADC for equalizing the first digital samples to generate a first equalized signal; and a decision circuit coupled to the first signal processing stage for generating a symbol decision signal from the first equalized signal. The data eye monitoring path includes: a second ADC configured to convert the received analog signal to second digital samples at a second sample rate, the second ADC further being configured to take samples at second sampling points different from the first sampling points at which the first ADC take samples; a second signal processing stage coupled to the second ADC, the second signal processing stage configured to determine difference between the first digital samples and the second digital samples, and combine the first equalized signal and the determined difference to generate an output of the second signal processing stage; and a data eye monitoring circuit coupled to the first signal processing stage and the second signal processing stage, the data eye monitoring circuit configured to determine a data eye error rate according to the symbol decision signal and the output of the second signal processing stage.

According to another embodiment, a digital serializer/deserializer circuit for a communication receiver is provided. The digital serializer/deserializer circuit includes: a data path and a data eye monitoring path. The data path includes: a first analog-to-digital converter (ADC) configured to convert a received analog signal to first digital samples at a first sample rate; a first signal processing stage coupled to the first ADC, the first signal processing stage including an equalizer coupled to the ADC for equalizing the first digital samples to generate a first equalized signal; and a decision circuit coupled to the first signal processing stage for generating a symbol decision signal from the first equalized signal. The data eye monitoring path includes: a slicing circuit coupled to the first ADC and the first signal processing stage, the slicing circuit being configured to slice the received analog signal according to a slicer level to generate second digital samples at a second sample rate, wherein the slicer level is determined according to the first equalized signal and the first digital samples; and a data eye monitoring circuit coupled to the slicing circuit, the data eye monitoring circuit configured to determine a data eye error rate according to the symbol decision signal and the second digital samples.

According to an alternative embodiment, a data eye monitoring method of a digital serializer/deserializer circuit for a communication receiver is provided. The data eye monitoring method includes: converting a received analog signal to first digital samples at a first sample rate; equalizing the first digital samples to generate a first equalized signal; generating a symbol decision signal from the first equalized signal; converting the received analog signal to second digital samples at a second sample rate, the second digital samples being sampled at second sampling points different from the first sampling points at which the first digital samples are sampled; determining difference between the first digital samples and the second digital samples, and combining the first equalized signal and the determined difference to generate a signal processing output; and determining a data eye error rate according to the symbol decision signal and the signal processing output.

Figure 1:
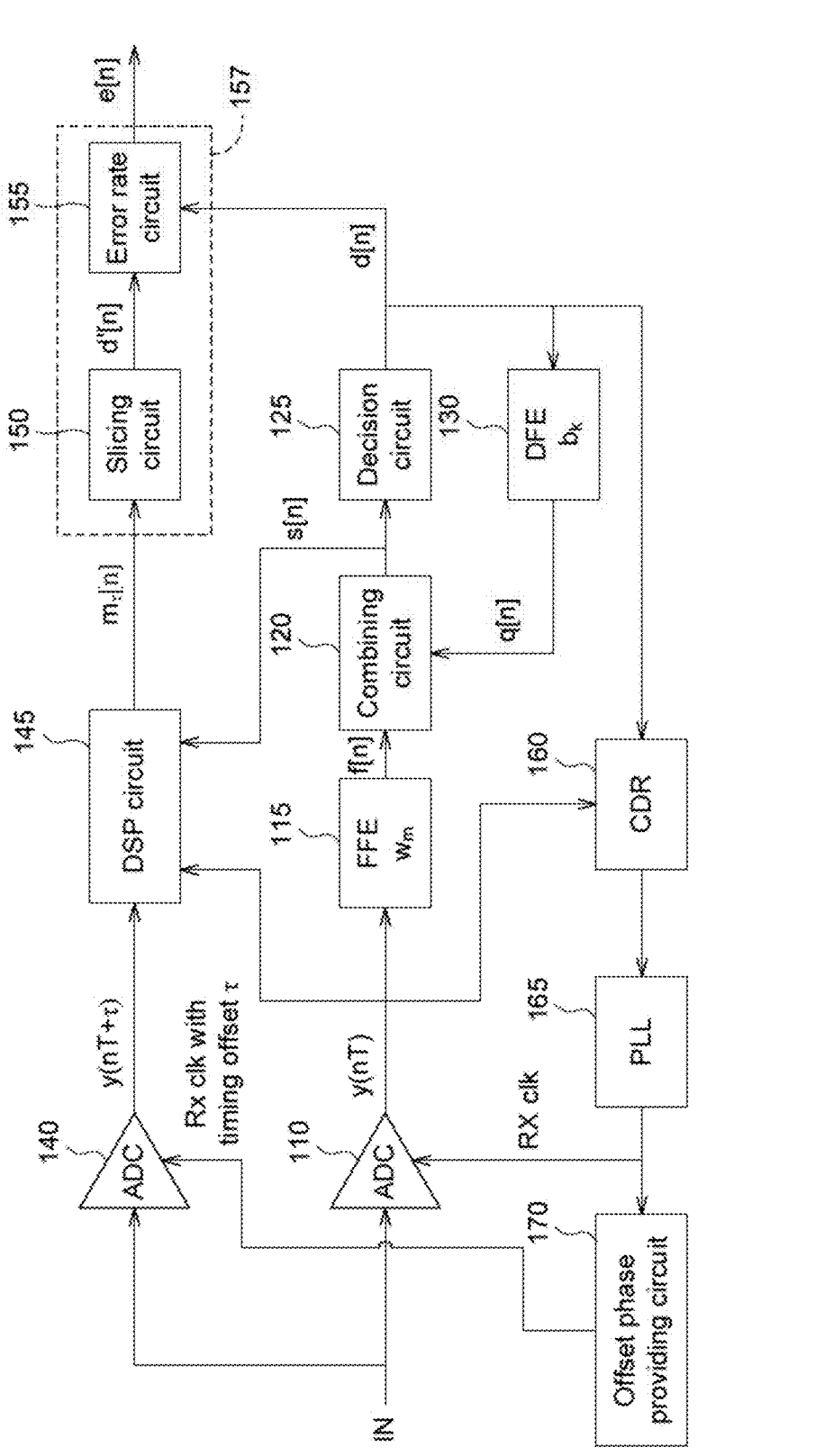
FIG. 1 is a diagram of a digital serializer/deserializer circuit according to a first embodiment of the application.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

DESCRIPTION OF THE EMBODIMENTS

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, one skilled person in the art would selectively implement part or all technical features of any embodiment of the disclosure or selectively combine part or all technical features of the embodiments of the disclosure.

FIG. 1 is a diagram of a digital serializer/deserializer (SerDes) circuit according to a first embodiment of the application. The digital serializer/deserializer circuit 100 according to the first embodiment of the application includes: a first ADC (analog to digital converter) 110, a feed-forward equalizer (FFE) 115, a combining circuit 120, a decision circuit 125, a decision-feedback equalizer (DFE) 130, a second ADC 140, a digital signal processing (DSP) circuit 145, a slicing circuit 150, an error rate circuit 155, a clock data recovery (CDR) circuit 160, a phase loop lock (PLL) circuit 165 and an offset phase providing circuit 170.

The first ADC 110, the FFE 115, the combining circuit 120, the decision circuit 125 and the DFE 130 form a data path. The second ADC 140, the DSP circuit 145, the slicing circuit 150 and the error rate circuit 155 form a data eye monitoring path. The slicing circuit 150 and the error rate circuit 155 form a data eye monitoring circuit 157, and the data eye monitoring circuit is not limited to this.

The data eye monitoring path, like the data path, is based on an ADC but is sampled or sub-sampled relative to the data path. In sub-sampling case (the sample rate of the second ADC 140 lower than the sample rate of the first ADC 110), if the data path operates at a data rate R, the data eye monitoring path operates at a data rate R/Q, where Q is an integer greater than 1. The ADC-based data eye monitoring path determines channel response at a sampling position (i.e., time index) that differs from the data sampling position in the data path. The difference between the output of the data path and the output of the data eye monitoring path can be used to determine the data eye error rate.

The data path operates in real time to provide symbol decision signal d[n]. The data eye monitoring path operates in real time to provide data eye error rate which is related to eye pattern.

An analog signal IN is received by the digital serializer/deserializer circuit 100, for example, through an interface. The analog signal IN is Pulse-amplitude modulation (PAM)-N signaling, where N being a positive integer; however, it is not limited to this. The analog signal IN is input into the first ADC 110 and the second ADC 140.

The first ADC 110 is configured for sampling the analog signal IN to generate first digital samples y(nT) at a first sample rate.

The second ADC 140 is configured to sample the analog signal IN at a second sample rate equal to or lower than the first sample rate that the first ADC 110 samples the analog signal IN. The second ADC 140 is further configured to take samples at varying sampling points along the analog signal IN. The second ADC 140 is configured to sample the analog signal IN at a second sample point different than the first sample point that the first ADC 110 samples the analog signal IN.

The second ADC 140 is configured for sampling the analog signal IN to generate second digital samples y(nT+τ) (when the second sample rate is equal to the first sample rate) or y(IT+τ) (when the second sample rate is lower than the first sample rate). y(nT+τ) (or y(IT+τ)) and y(nT) represent samples of the received analog signal IN at times nT+τ(or IT+τ) and nT, respectively. T is the sampling period, and τ is a timing offset provided by the offset phase providing circuit 170. Wherein "I" is an integer times of "n". For example, when "I" is four times of "n", then the first ADC 110 samples the analog signal IN 20 times while the second ADC 140 just samples the analog signal IN (20/4)=5 times. For the convenience of explanation, the embodiment of the present application is illustrated by taking the first sampling rate equal to the second sampling rate as an example, but the present application is not limited to this. For example, the embodiment of the present application is also applicable to the case where the second sampling rate is less than the first sampling rate, specifically, the first sampling rate is an integer multiple of the second sampling rate, hence, the y(IT+τ) is corresponding to y(IT), and the y(IT+τ) is derived by the second ADC 140 while the y(IT) is derived by the first ADC 110, wherein the "I" is an integer times of "n".

The FFE 115 is coupled to the first ADC 110. The FFE 115 is configured to filter the first digital samples y(nT) to generate the feed forward equalized signals f[n](or said FFE outputs).

The combining circuit 120, coupled to the FFE 115, is configured to combine the feed forward equalized signals f[n] with the decision feedback equalized signals q[n] to generate equalized signals s[n]. In one possible example, the combining circuit 120 includes an adder circuit which adds or subtracts the feed forward equalized signals f[n] with the decision feedback equalized signals q[n] to generate equalized signals s[n], wherein s[n]=f[n]-q[n].

The decision circuit 125, coupled to the combining circuit 120, is configured to generate the symbol decision signal d[n] based on a data threshold th_data by slicing the equalized signals s[n]. For example but not limited by, when the equalized signal s[n] is higher than or equal to the data threshold th_data, the decision circuit 125 generates a logic 1 symbol decision signal d[n]; and when the equalized signal s[n] is lower than the data threshold th_data, the decision circuit 125 generates a logic 0 symbol decision signal d[n].

The DFE 130, coupled to the decision circuit 125, is configured to process (for example but not limited by, filters) the symbol decision signal d[n] from the decision circuit 125 to generate the decision feedback equalized signals q[n] for providing to the combining circuit 120. The FFE 115, DFE 130 and the combining circuit 120 can be referred as a first signal processing stage.

The DSP circuit 145, coupled to the second ADC 140, includes two adders and one multiplier, wherein one of the multipliers of the multiplier is related with coefficient from FFE 115's main tap. The DSP circuit 145 generates the DSP output samples $m_\tau[n]$ based on the equalized signals s[n] from the combining circuit 120, the first digital samples y(nT) from the first ADC 110 and the second digital samples from the second ADC 140. Details of the DSP circuit 145 will be described below. The multiplier or the coefficient from FFE 115's main tap can set as 1 for simplification. The DSP circuit 145 is also referred as a second signal processing stage which is coupled to the second ADC 140, the second signal processing stage is configured to determine difference between the first digital samples and the second digital samples, and combine the first equalized signal and the determined difference to generate an output of the second signal processing stage.

The slicing circuit 150, coupled to the DSP circuit 145, is configured to generate the slicing samples d'[n] based on an EOM threshold th_EOM by slicing the DSP output samples $m_\tau[n]$. For example but not limited by, when the DSP output samples $m_\tau[n]$ is higher than or equal to the EOM threshold th_EOM, the slicing circuit 150 generates a logic 1 slicing sample d'[n]; and when the DSP output samples $m_\tau[n]$ is lower than the EOM threshold th_EOM, the slicing circuit 150 generates a logic 0 slicing sample d'[n]. The above is just for an example. In another possible embodiment of the application, for PAM-N signals, there may be N−1 EOM thresholds (th_EOM1−th_EOM(N−1)), which is still within the spirit and the scope of the application. That is, the slicing circuit 150 is coupled to the DSP circuit 145 (i.e. the second signal processing stage), the slicing circuit 150 is configured to output slicing samples d'[n] above a plurality of adjustable data eye thresholds.

The error rate circuit 155, coupled to the slicing circuit 150 and the decision circuit 125, is configured to generate the data eye error rate e[n] based on the slicing samples d'[n] from the slicing circuit 150 and the symbol decision signal d[n] from the decision circuit 125.

The CDR circuit 160 is used to extract timing information (clock information) from the symbol decision signal d[n] based on the first digital samples y(nT) from the first ADC 110. In essence, the CDR circuit 160 is designed to regenerate the receiving clock from the symbol decision signal d[n], which is critical for maintaining data integrity and synchronization. The receiving clock regenerated by the CDR circuit 160 is input into the PLL circuit 165.

The PLL circuit 165 is configured for synchronizing an output oscillator signal with a reference signal in terms of both frequency and phase. In one possible example of the application, the PLL circuit 165 is configured for generating a synchronized receiving clock based on the receiving clock regenerated by the CDR circuit 160 in terms of both frequency and phase. The synchronized receiving clock from the PLL circuit 165 is input into the ADC 110 and the offset phase providing circuit 170.

The offset phase providing circuit 170 is configured for providing the timing offset T to the second ADC 140. For example, the timing offset T indicates an offset time from nT.

The equalized signals s[n] is represented as the following equation (1):

$$s[n] = f[n] + q[n] = \sum_{i=-N}^{M} w_i * y(nT - iT) + \sum_{j=1}^{k} b_j * d[n-j] \qquad (1)$$

wherein the equation (1) can also be described as $s[n]=\sum_m w_m * y(nT-mT)+\sum_k b_k * d[n-k]$.

In the equation (1), the term $$\sum_{i=-N}^{M} w_i * y(nT - iT)$$

is the feed forward equalized signals f(n), wherein (N+M+1) equaling to m indicates total tap number of the FFE 115, which includes N pre-cursor taps, main tap and M post-curser taps, $w_0$ refers the coefficient corresponding to the main tap and $w_i$ refers to an i-th coefficient corresponding to the i-th FFE tap. The term $$\sum_{j=1}^{k} b_j * d[n-j]$$

is the decision feedback equalized signals q[n], k indicates the total tap number of the DFE 130, and $b_j$ refers to an j-th coefficient corresponding to the j-th DFE tap.

The DSP circuit 145 is configured to perform operation as the following equation (2).

$$s[n] + w_0 * [y(nT + \tau) - y(nT)] \qquad (2)$$

The operations of the DSP circuit 145 are as follows.

In fact, the DSP output samples $m_\tau[n]$ should be represented as the equation (3).

$$m_\tau[n] = \sum_m w_m * y(nT - mT + \tau) + \sum_k b_k * d[n-k] \qquad (3)$$

In the equation (3), the term $\sum_m w_m * y(nT-mT+\tau)$ is the FFE output with offset sample. In the embodiment, only the main (largest) FFE tap coefficient $w_0$ is selected (because the main FFE tap $w_0$ is much larger than other FFE tap coefficients) and thus the equation (3) can be modified as the equation (4). The weighting coefficient is corresponding to a main tap coefficient of the FFE 115.

$$m_\tau[n] \approx \sum_k b_k * d[n-k] + \sum_{m \neq 0} w_m * y(nT - mT) + w_0 * y(nT + \tau) = \quad (4)$$
$$s[n] - w_0 * y(nT) + w_0 * y(nT + \tau) = s[n] + w_0(y(nT + \tau) - y(nT))$$

Figure 2:
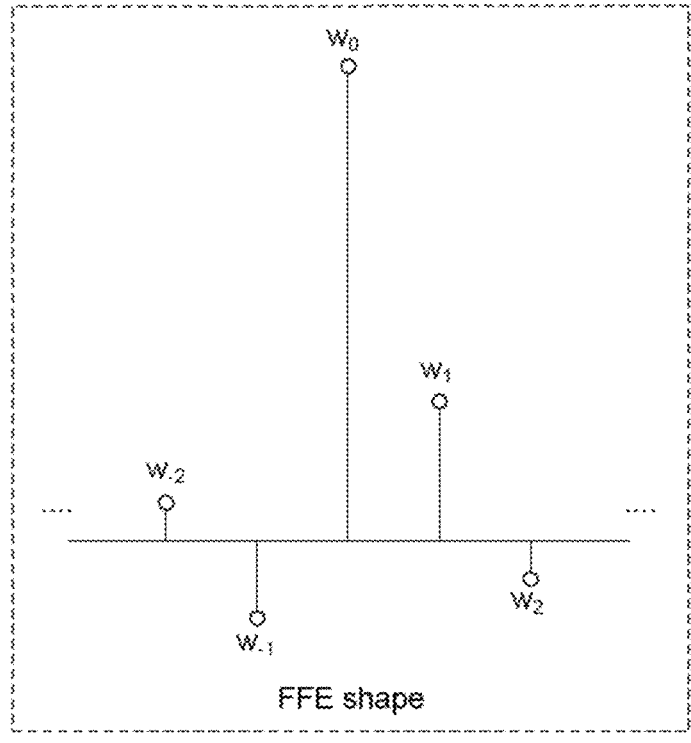
FIG. 2 shows FFE shape and the definition of r.
Figure 2:
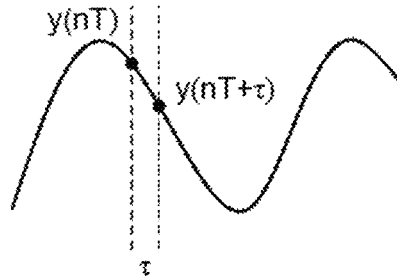

In the equation (4), only main tap ($w_0$) is used as the offset sample. FIG. 2 shows FFE shape and the definition of T. As shown in FIG. 2, taking m=5 as an example, the FFE has coefficients $w_0$, $w_1$, $w_2$, $w_{-1}$ and $w_{-2}$, wherein $w_0$ is main (largest) FFE tap.

Figure 3:
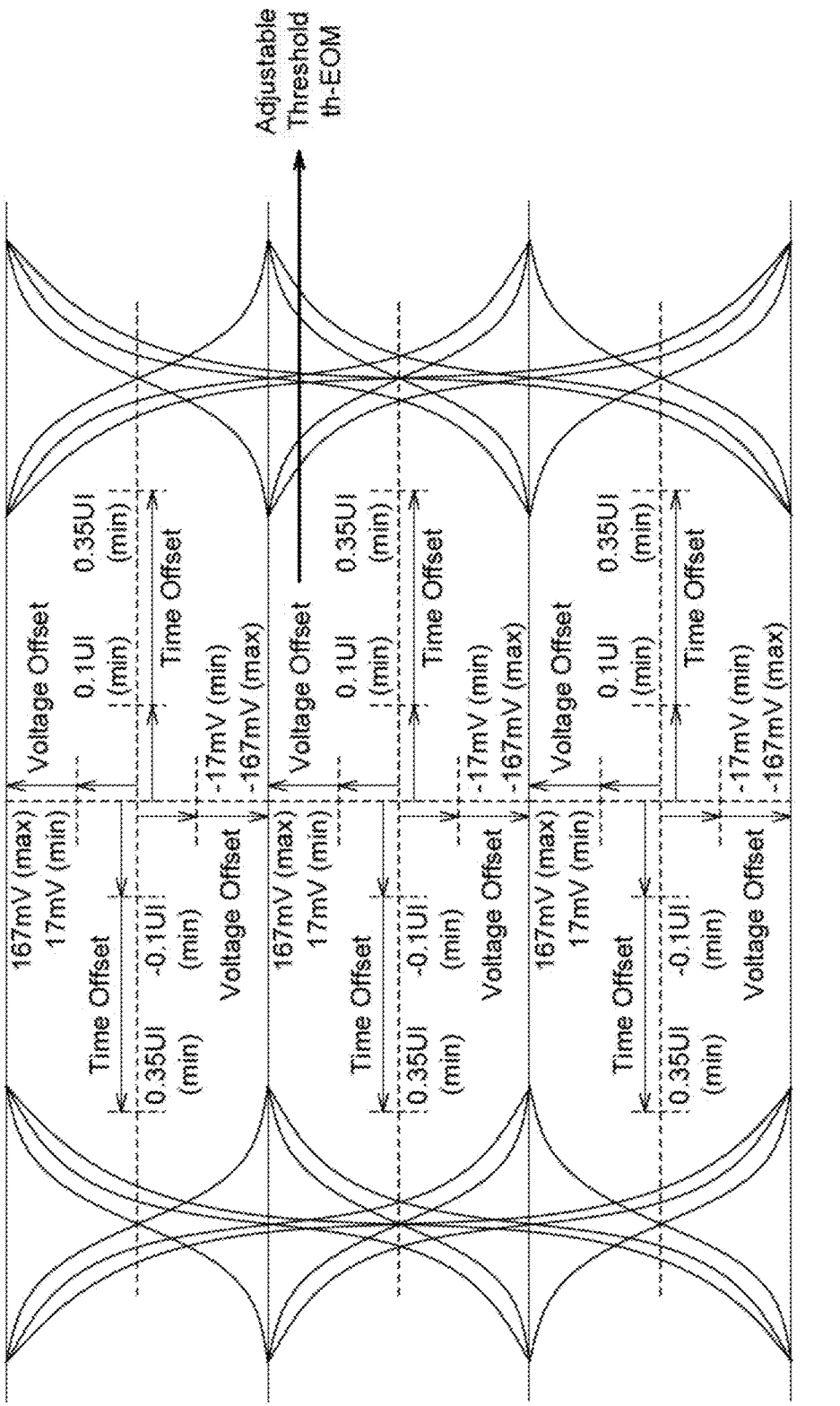
FIG. 3 shows eye height and eye width scanning according to the first embodiment of the application.

FIG. 3 shows eye height and eye width scanning according to the first embodiment of the application. As shown in FIG. 3, the EOM threshold th_EOM is adjustable so that an error rate is obtained for estimating the eye height.

Figure 4:
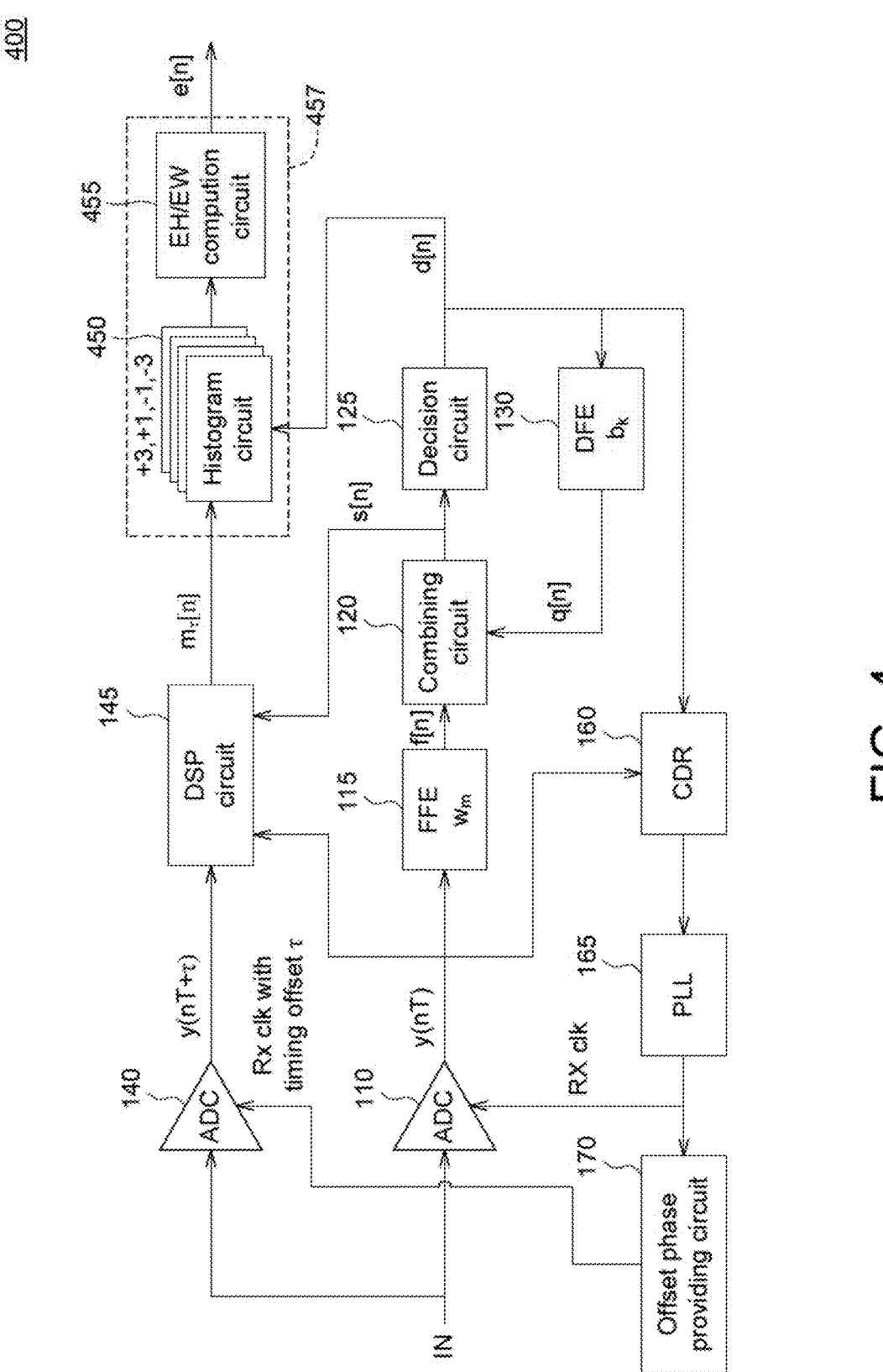
FIG. 4 is a diagram of a digital serializer/deserializer circuit according to a second embodiment of the application.

FIG. 4 is a diagram of a digital serializer/deserializer circuit according to a second embodiment of the application. The digital serializer/deserializer circuit 400 according to the second embodiment of the application includes: a first ADC 110, a feed-forward equalizer (FFE) 115, a combining circuit 120, a decision circuit 125, a decision-feedback equalizer (DFE) 130, a second ADC 140, a digital signal processing (DSP) circuit 145, a histogram circuit 450, an eye-height (EH) eye-width (EW) computation circuit 455, a clock data recovery (CDR) circuit 160, a phase loop lock (PLL) circuit 165 and an offset phase providing circuit 170. The first ADC 110, the FFE 115, the combining circuit 120, the decision circuit 125 and the DFE 130 form a data path. The second ADC 140, the DSP circuit 145, the histogram circuit 450, and the EH-EW computation circuit 455 form a data eye monitoring path. The histogram circuit 450 and the EH-EW computation circuit 455 form a data eye monitoring circuit 457.

The histogram circuit 450 is coupled to the DSP circuit 145. The histogram circuit 450 is an electronic circuit which is designed to generate and analyze histograms in real-time based on the symbol decision signal d[n] and the DSP output samples $m_\tau[n]$. Histograms are graphical representations showing the frequency distribution of a set of data, typically used to understand the distribution characteristics of data sets in various applications. The histogram circuit 450 has several different histograms for PAM-N signaling. The histogram circuit 450 is configured to determine which histogram for the output of the DSP circuit 145 (or said a second signal processing stage) based on the symbol decision signal d[n] and the DSP output samples $m_\tau[n]$. Further, the histogram circuit 450 is configured to generate a histogram for the output of the second signal processing stage.

The EH-EW computation circuit 455 is used in the field of high-speed digital communications, particularly in the analysis of signal integrity and performance of communication channels. An eye diagram is a graphical representation of a digital signal from a receiver's perspective. An eye diagram overlays multiple bits of a digital signal to form a characteristic pattern that resembles an eye. Eye-height is the vertical opening of the eye diagram. Eye-height represents the voltage margin available for signal interpretation without errors. A larger eye-height indicates a better signal-to-noise ratio, implying that the signal is more distinguishable from noise. The eye-height is measured as the difference between the maximum and minimum voltage levels of the eye diagram at the decision instant, which is usually at the center of the bit period. Eye-width is the horizontal opening of the eye diagram. Eye-width represents the time margin during which the signal can be correctly sampled. A larger eye-width indicates better timing margin, allowing more tolerance to timing jitter and skew. The eye-width is measured as the time difference between the rising and falling edges of the eye diagram at the decision threshold. In one possible example, the EH-EW computation circuit 455 is designed to automatically measure and analyze the eye diagram parameters, providing crucial insights into the performance of communication channels. The EH-EW computation circuit 455 captures the digital signals using high-speed oscilloscopes or specialized hardware that can sample the digital signals at a very high rate. The captured data is processed by the EH-EW computation circuit 455 to overlay multiple bits of the signal, forming the eye diagram. The EH-EW computation circuit 455 uses suitable algorithms to analyze the eye diagram to compute the eye-height and eye-width. These algorithms identify the maximum and minimum voltage levels at the decision instant for eye-height and the time interval between zero crossings at the decision threshold for eye-width. The computed values of the EH-EW computation circuit 455 are then displayed or used to further analyze the communication channel's performance. The EH-EW computation circuit 455, coupled to the histogram circuit 450, determines a data eye height and a data eye width based on the histogram from the histogram circuit 450 to determine a data eye error rate e[n].

Figure 5:
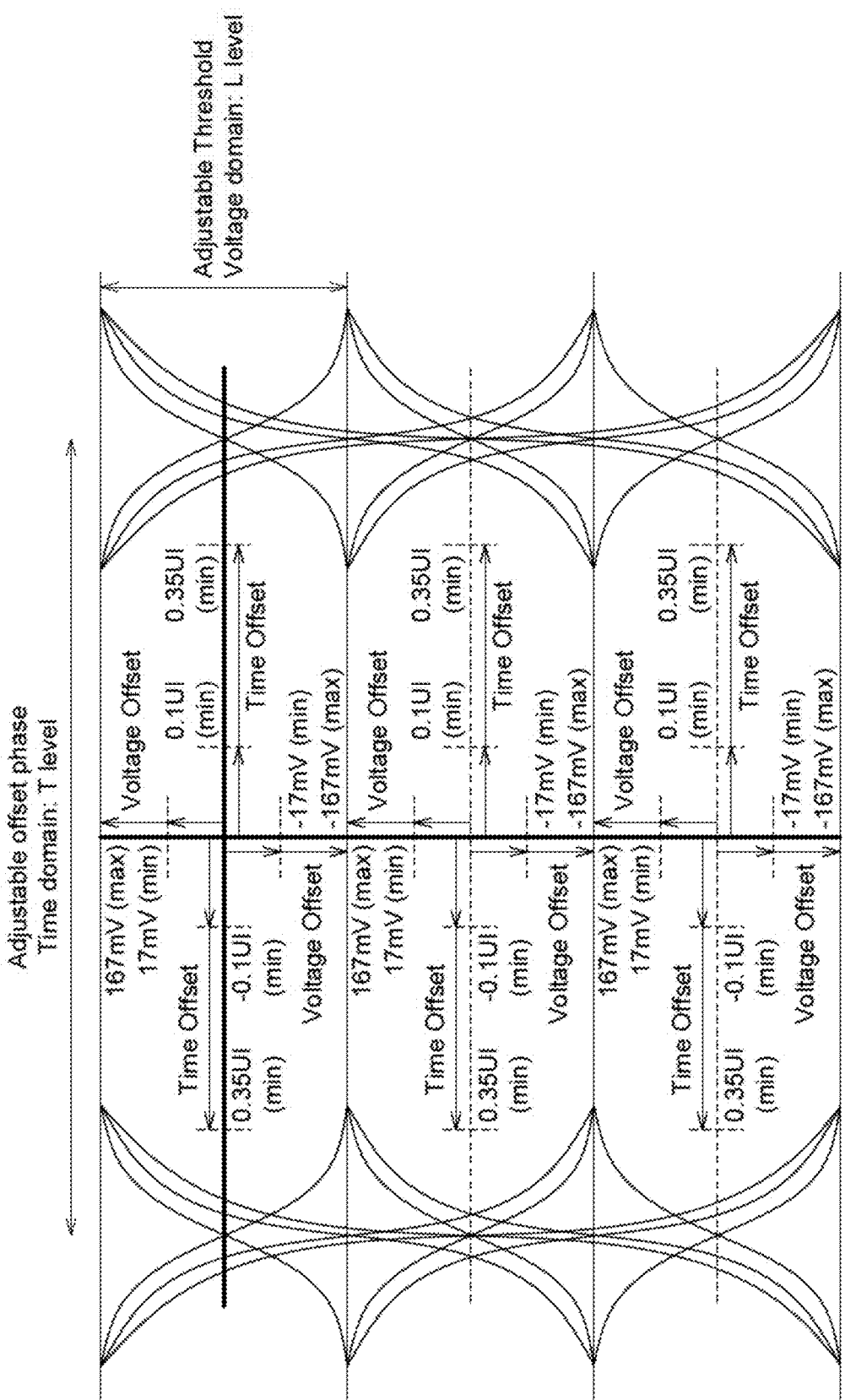
FIG. 5 shows eye height and eye width scanning according to the second embodiment of the application.

FIG. 5 shows eye height and eye width scanning according to the second embodiment of the application. In FIG. 5, the histogram circuit 450 is helpful in speeding up lane margining process. For example, it is assumed that X data are required in each set of phase and threshold. In the first embodiment, the threshold th_EOM is adjusted L times at each phase and thus the total time is: X*N*L. In the second embodiment, L levels can be compared at the same time, and thus the total time is X*T. By applying the histogram circuit 450, the second embodiment has advantage of 1/L times reduction.

In short, according to the first and the second embodiments of the application, a digital serializer/deserializer circuit for a (communication) receiver is disclosed. The digital serializer/deserializer circuit for a (communication) receiver includes: a data path and a data eye monitoring path. The data path includes: a first analog-to-digital converter (ADC), configured to convert a received analog signal to first digital samples at a first sample rate; a first signal processing stage coupled to the first ADC, the first signal processing stage including an equalizer coupled to the first ADC for equalizing the first digital samples to generate a first equalized signal; and a decision circuit coupled to the first signal processing stage for generating a symbol decision signal from the first equalized signal. The data eye monitoring path includes: a second ADC configured to convert the received analog signal to second digital samples at a second sample rate, the second ADC further being configured to take samples at second sampling points different from the first sampling points at which the first ADC take samples; a second signal processing stage coupled to the second ADC, the second signal processing stage configured to determine difference between the first digital samples and the second digital samples, and combine the first equalized signal and the determined difference to generate an output of the second signal processing stage; and a data eye monitoring circuit coupled to the first signal processing stage and the second signal processing stage, the data eye monitoring circuit configured to determine a data eye error rate according to the symbol decision signal and the output of the second signal processing stage.

Figure 6:
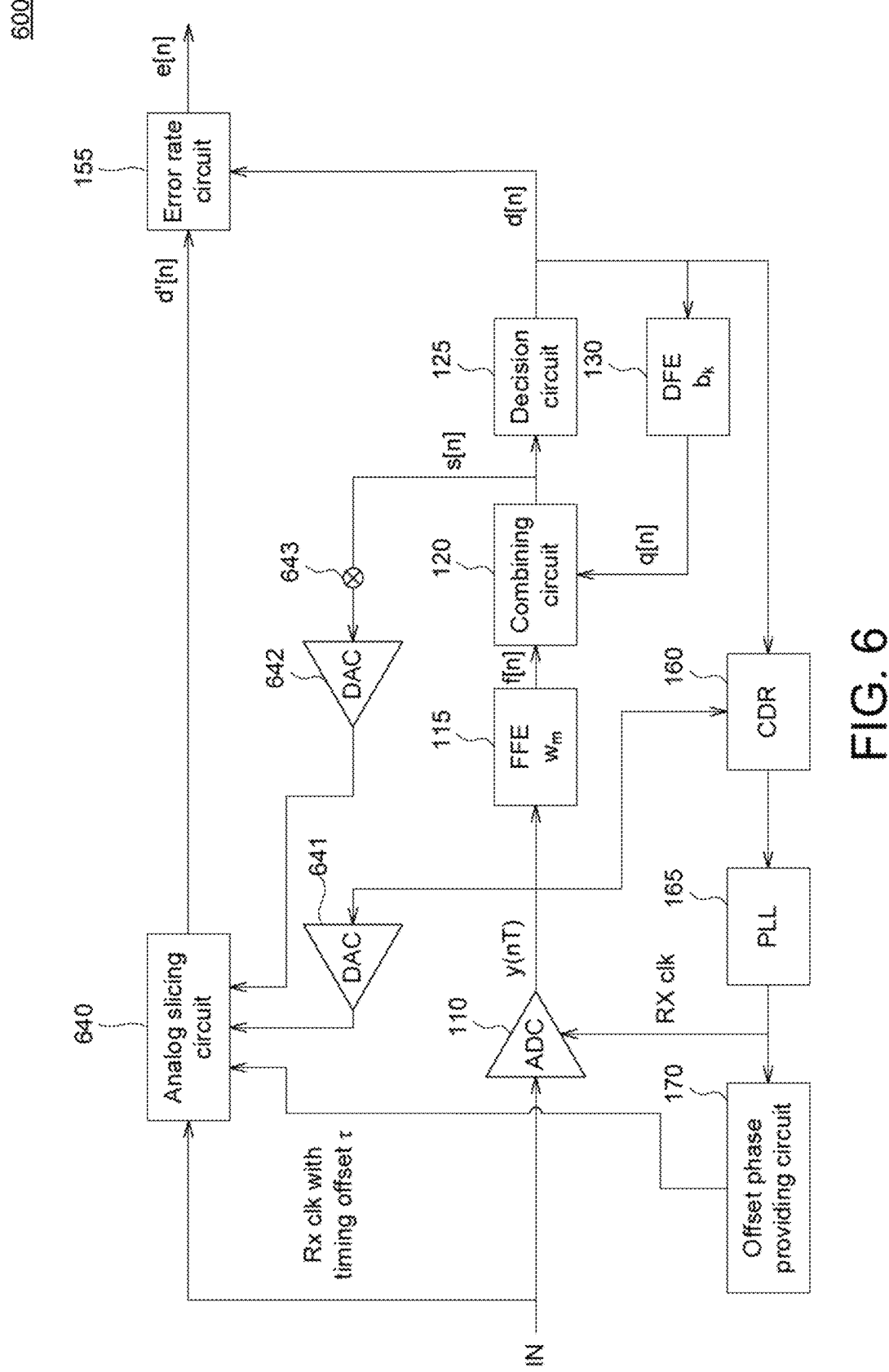
FIG. 6 is a diagram of a digital serializer/deserializer circuit according to a third embodiment of the application.

FIG. 6 is a diagram of a digital serializer/deserializer circuit according to a third embodiment of the application. The digital serializer/deserializer circuit 600 according to the third embodiment of the application includes: a first ADC 110, a FFE 115, a combining circuit 120, a decision circuit 125, a DFE 130, an analog slicing circuit 640, a first digital-analog-converter (DAC) 641, a second DAC 642, a multiplier 643, an error rate circuit 155, a clock data recovery (CDR) circuit 160, a phase loop lock (PLL) circuit 165 and an offset phase providing circuit 170. The first ADC 110, the FFE 115, the combining circuit 120, the decision circuit 125 and the DFE 130 form a data path. The analog slicing circuit 640, the first DAC 641, the second DAC 642, the multiplier 643, and the error rate circuit 155 form a data eye monitoring path. The analog slicing circuit 640 forms a data path monitoring circuit.

The first DAC 641 is coupled to the first ADC 110 and the analog slicing circuit 640. The first DAC 641 is configured to convert the first digital samples y(nT) into a first analog signal which is used to determine the slicer level of the analog slicing circuit 640.

The second DAC 642 is coupled to the multiplier 643 and the analog slicing circuit 640. The multiplier 643 is coupled to the combining circuit 120 and the second DAC 642. The multiplier 643 multiplies the reciprocal ($1/w_0$) of the FFE 115 main tap with the equalized signals s[n] to generate a multiplication result (i.e. ($1/w_0$)*s[n]).

The second DAC 642 is configured to convert the multiplication result (i.e. ($1/w_0$)*s[n]) into second analog signal which is used to determine the slicer level of the analog slicing circuit 640.

The analog slicing circuit 640 is coupled to the first ADC 110, a first signal processing stage (including the FFE 115, the DFE 130 and the combing circuit 120) and the decision circuit 125. The analog slicing circuit 640 is configured to slice the received analog signal IN according to a slicer level to generate second digital samples d'[n] at a second sample rate, wherein the slicer level is determined according to the equalized signals s[n] and the first digital samples y(nT). The second digital samples d'[n] are derived by the analog slicing circuit 640 at second sampling points different from the first sampling points at which the first digital samples are derived, and the second sample rate may be equal or lower than the first sample rate.

For example, the analog slicing circuit 640 compares the slicer level s[n]+$w_0$(y(nT+$\tau$)−y(nT)) with the slicing threshold th_new:

$$s[n] + w_0(y(nT + \tau) - y(nT)) \geqq \text{th\_new} \qquad (5)$$

That is, when s[n]+$w_0$(y(nT+$\tau$)−y(nT)) is higher than or equal to the slicing threshold th_new, the analog slicing circuit 640 outputs logic 1 as the slicing samples d'[n]; and when s[n]+$w_0$(y(nT+$\tau$)−y(nT)) is lower than the slicing threshold th_new, the analog slicing circuit 640 outputs logic 0 as the slicing samples d'[n].

Equation (5) can be rewritten as equation (6).

$$y(nT + \tau) \geq \left( \left( \frac{1}{w_0} \right) * (\text{th\_new} - s[n]) + y(nT) \right) \qquad (6)$$

In summary, the third embodiment of the application discloses a digital serializer/deserializer circuit for a communication receiver. The digital serializer/deserializer circuit includes a data path and a data eye monitoring path. The data path includes: a first analog-to-digital converter (ADC) configured to convert a received analog signal to first digital samples at a first sample rate; a first signal processing stage coupled to the first ADC, the first signal processing stage including an equalizer coupled to the ADC for equalizing the first digital samples to generate a first equalized signal; and a decision circuit coupled to the first signal processing stage for generating a symbol decision signal from the first equalized signal. The data eye monitoring path includes: a slicing circuit coupled to the first ADC and the first signal processing stage, the slicing circuit being configured to slice the received analog signal according to a slicer level to generate second digital samples at a second sample rate, wherein the slicer level is determined according to the first equalized signal and the first digital samples; and a data eye monitoring circuit coupled to the slicing circuit, the data eye monitoring circuit configured to determine a data eye error rate according to the symbol decision signal and the slicing samples.

Figure 7:
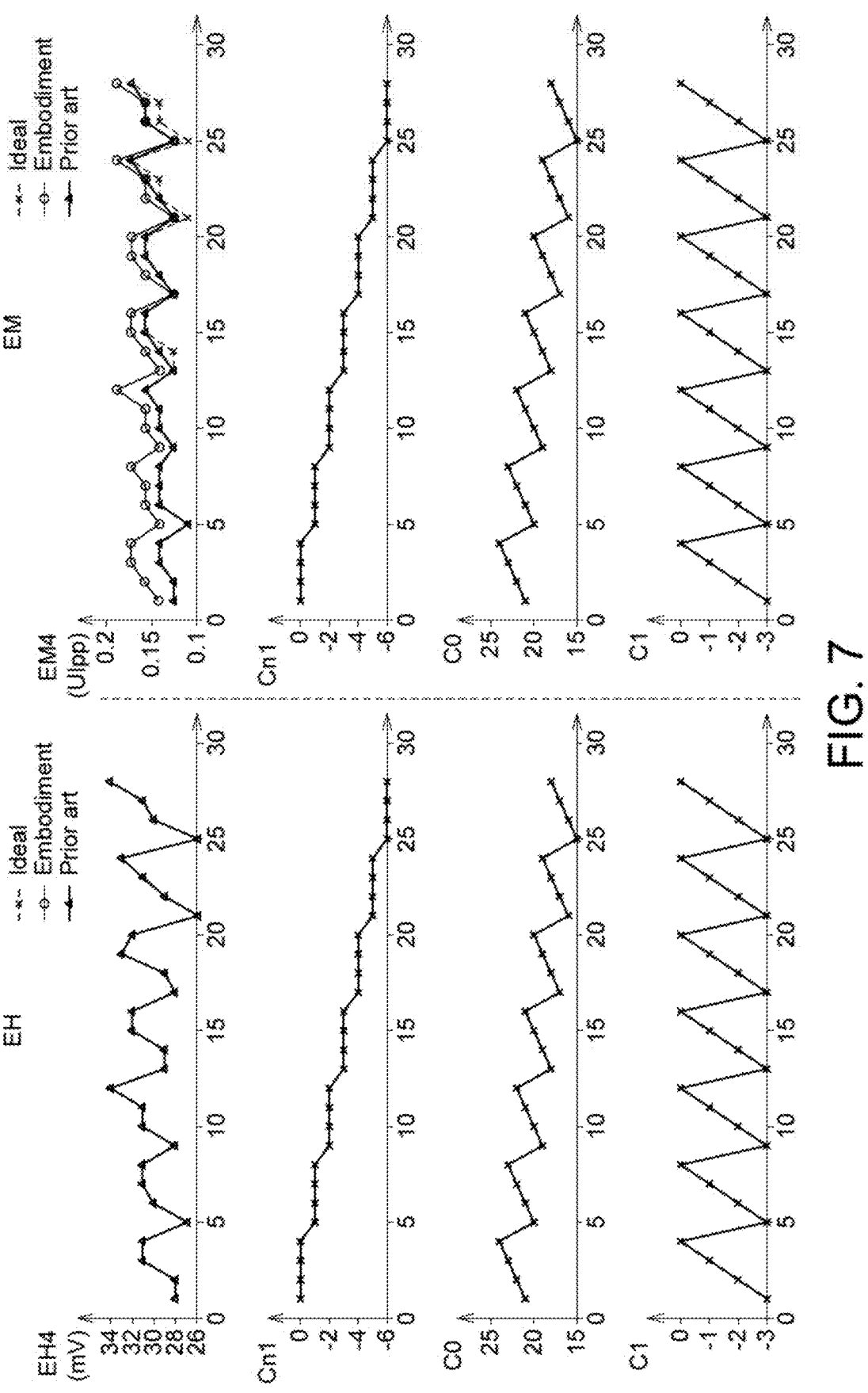
FIG. 7 shows eye-height (EH) and eye-width (EW) comparison between ideal situation, one embodiment of the application and the prior art.

FIG. 7 shows eye-height (EH) and eye-width (EW) comparison between ideal situation, one embodiment of the application and the prior art. As shown in FIG. 7, eye height is almost the same for ideal situation, one embodiment of the application and the prior art; and eye width has the same trend for ideal situation, one embodiment of the application and the prior art.

Figure 8:
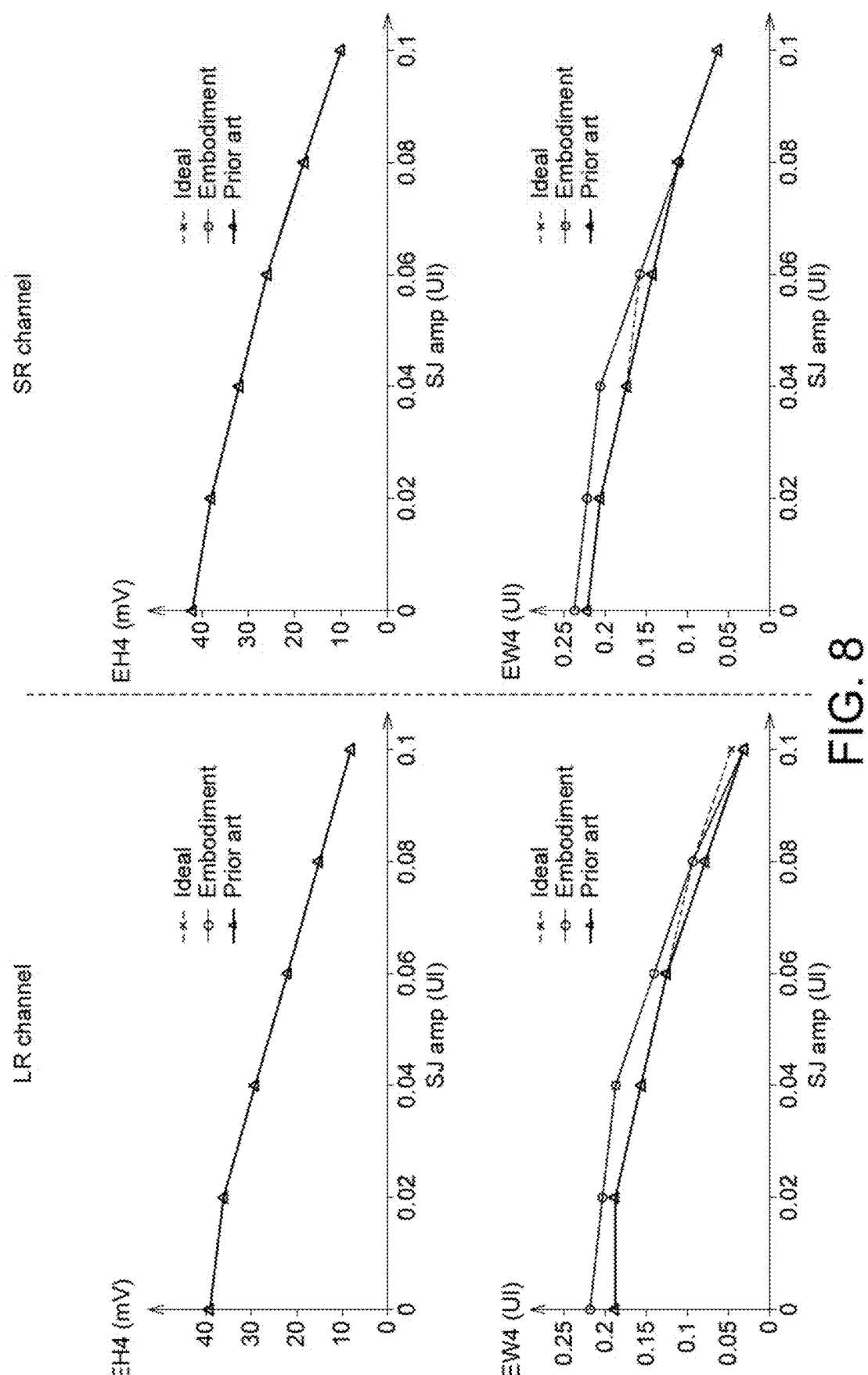
FIG. 8 shows transmitter jitter sensitive comparison between ideal situation, one embodiment of the application and the prior art.

FIG. 8 shows transmitter jitter sensitive comparison between ideal situation, one embodiment of the application and the prior art. As shown in FIG. 8, short reach (SR) channels has larger EH and EW than long reach (LR) channels. Eye height is almost the same for ideal situation, one embodiment of the application and the prior art; and eye width has the same trend for ideal situation, one embodiment of the application and the prior art.

Figure 9:
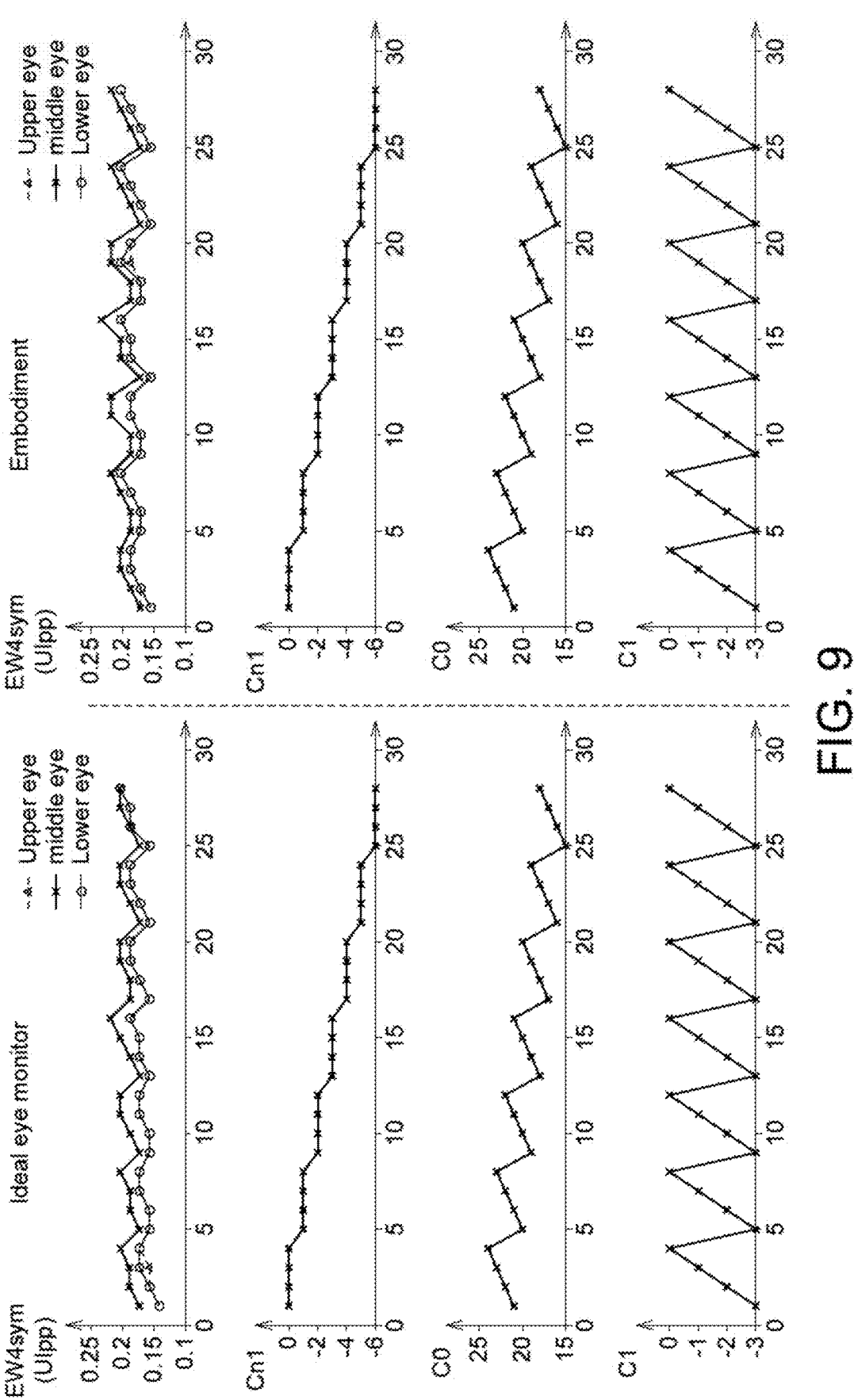
FIG. 9 shows eye monitor comparison between ideal situation and one embodiment of the application.

FIG. 9 shows eye monitor comparison between ideal situation and one embodiment of the application. As shown in FIG. 9, in both of the ideal eye monitor and the embodiment of the application, middle EW is the largest.

Figure 10:
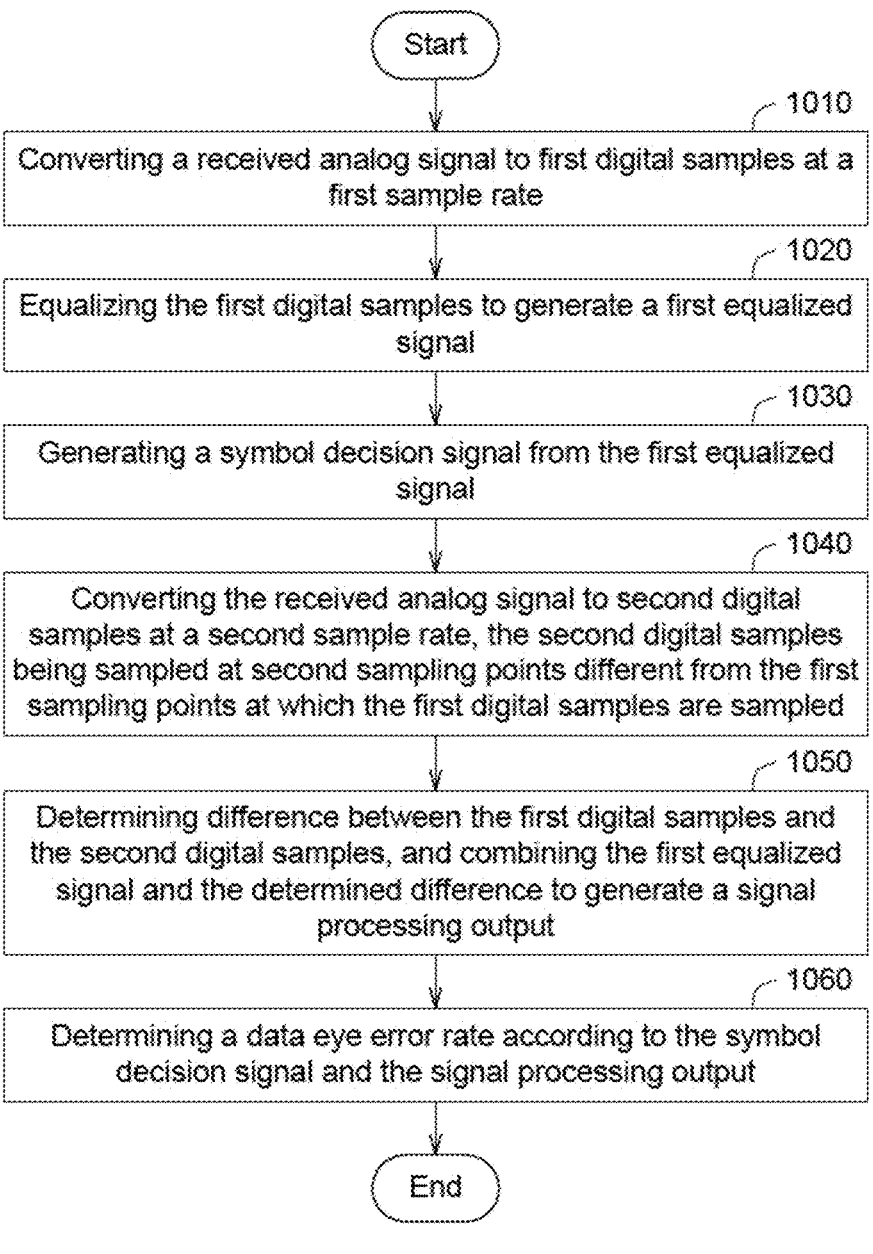
FIG. 10 shows a data eye monitoring method of a digital serializer/deserializer circuit for a communication receiver according to one embodiment of the application.

FIG. 10 shows a data eye monitoring method of a digital serializer/deserializer circuit for a communication receiver according to one embodiment of the application. The data eye monitoring method includes: (1010) converting a received analog signal to first digital samples at a first sample rate; (1020) equalizing (or filtering) the first digital samples to generate a first equalized signal; (1030) generating a symbol decision signal from the first equalized signal; (1040) converting the received analog signal to second digital samples at a second sample rate, the second digital samples being sampled at second sampling points different from the first sampling points at which the first digital samples are sampled; (1050) determining difference between the first digital samples and the second digital samples, and combining the first equalized signal and the determined difference to generate a signal processing output; and (1060) determining a data eye error rate according to the symbol decision signal and the signal processing output.

In the above embodiments and other possible embodiments of the application, the data eye monitoring path in implementations of the subject matter of this disclosure can operate at only a fraction (1/P) of the data rate of the data path, smaller, slower circuit, which consumes less power may be provided. Nevertheless, sufficient filter circuit is provided in the EOM path that data in the main data path is not adversely affected by the monitoring function—i.e., the EOM path is non-destructive of data in the main data path. Portions of the EOM path that are similar to portions of the main data path (e.g., the analog-to-digital converter), but operate at 1/P of the data rate of the main data path, consume about 1/P of the power of the corresponding portions of the main data path, but because the EOM path does not replicate the complete main data path, the overall power consumption of the EOM path is even less than 1/P of the power consumption of the main data path.

In embodiments of the application, a data eye monitoring path only replaces the offset phase sample in the FFE main tap and makes use of data path equalizer (FFE and DFE) output, therefore, embodiments of the application can avoid heavy digital filter computation in the data eye monitoring path. Sub-sampling ADC can be used due to no need consecutive baud rate sample in FIR computation.

Still further, embodiments of the application use histogram to compute Eye-height instead of sweeping through varying threshold value for different samples. Embodiments of the application can reduce eye height computation time. Simulation result shows that the reduced cost eye monitor has same trend as ideal eye monitor by adjusting the transmitter signal quality.

In embodiments of the application, with the introduction of low-cost eye monitoring with respect to conventional eye monitoring, the digital filter in monitoring path is avoided but also digital equalizer effect is considered. Still further, sub-sampling ADC can be applied for non-destructive eye data monitoring. Eye height is completely the same as the ideal eye monitor and small offset eye width compared with the ideal eye monitor.

The foregoing mainly describes the solutions provided in the embodiments of the application. It may be understood that, to implement the foregoing functions, the digital serializer/deserializer circuit includes corresponding hardware structures and/or software modules for performing the functions. A person skilled in the art should easily be aware that, in combination with units and algorithm steps of the examples described in the embodiments disclosed in this specification, this application may be implemented in a hardware form or in a form of combining hardware with computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In one embodiment of the application, the digital serializer/deserializer circuit may be divided into function modules based on the foregoing method examples. For example, each function module may be obtained through division based on each corresponding function, or two or more functions may be integrated into one processing module. The integrated module may be implemented in a form of hardware, or may be implemented in a form of a software function module. It should be noted that, in the embodiments of this application, division into modules is an example, and is merely logical function division. During actual implementation, another division manner may be used. An example in which each function module is obtained through division based on each corresponding function is used below for description.

While this document may describe many specifics, these should not be construed as limitations on the scope of an invention that is claimed or of what may be claimed, but rather as descriptions of features specific to particular embodiments. Certain features that are described in this document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination in some cases can be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results.

Only a few examples and implementations are disclosed. Variations, modifications, and enhancements to the described examples and implementations and other implementations can be made based on what is disclosed.

What is claimed is:

1. A digital serializer/deserializer circuit for a receiver, the digital serializer/deserializer circuit comprising a data path and a data eye monitoring path, wherein:
    the data path comprises:
    a first analog-to-digital converter (ADC), configured to convert a received analog signal to first digital samples at a first sample rate;
    a first signal processing stage coupled to the first ADC, the first signal processing stage comprising an equalizer coupled to the first ADC for equalizing the first digital samples to generate a first equalized signal; and
    a decision circuit coupled to the first signal processing stage for generating a symbol decision signal from the first equalized signal; and
    the data eye monitoring path comprises:
    a second ADC configured to convert the received analog signal to second digital samples at a second sample rate, and further configured to take samples at second sampling points different from the first sampling points at which the first ADC takes samples;
    a second signal processing stage coupled to the second ADC, and configured to receive the first digital samples from an output of the first ADC prior to said first signal processing stage, determine a difference signal between the first digital samples and the second digital samples, and combine the first equalized signal and the difference signal to generate an output of the second signal processing stage; and
    a data eye monitoring circuit coupled to the first signal processing stage and the second signal processing stage, and configured to determine a data eye error rate according to the symbol decision signal and the output of the second signal processing stage.

2. The digital serializer/deserializer circuit according to claim 1, wherein the second sample rate is equal to or lower than the first sample rate.

3. The digital serializer/deserializer circuit according to claim 1, wherein the equalizer comprises:
    a feed-forward equalizer (FFE) coupled to the first ADC for filtering the first digital samples to generate a feed forward equalized signal;

a decision feedback equalizer (DFE) coupled to the decision circuit for processing the symbol decision signal to generate a decision feedback equalized signal; and a combining circuit coupled to the FFE and the DFE for combining the feed forward equalized signal and the decision feedback equalized signal to generate the first equalized signal.

4. The digital serializer/deserializer circuit according to claim 1, wherein the output of the second signal processing stage is represented by a formula: $s[n]+w_0(y(nT+\tau)-y(nT))$, wherein: $s[n]$ represents the first equalized signal, $w_0$ is a weighting coefficient, $y(nT)$ represents the first digital samples which are samples of the received analog signal at times $nT$, $y(nT+\tau)$ represents the second digital samples which are samples of the received analog signal at times $nT+\tau$, $T$ is the sampling period, and $\tau$ is a time offset.

5. The digital serializer/deserializer circuit according to claim 4, wherein the weighting coefficient is corresponding to a main tap coefficient of an FFE within the equalizer.

6. The digital serializer/deserializer circuit according to claim 5, wherein the main tap coefficient of the FFE is set as 1.

7. The digital serializer/deserializer circuit according to claim 1, wherein the second signal processing stage comprises two adders and one multiplier, wherein the multiplier is configured to multiply the difference signal by a weighting coefficient which is corresponding to a main tap coefficient of an FFE within the equalizer.

8. The digital serializer/deserializer circuit according to claim 1, wherein the data eye monitoring circuit comprises:

a slicing circuit coupled to the second signal processing stage, and configured to output slicing samples above a plurality of adjustable data eye thresholds; and an error rate circuit coupled to the slicing circuit, and configured to determine the data eye error rate according to the symbol decision signal and the slicing samples.

9. The digital serializer/deserializer circuit according to claim 1, wherein the received analog signal is of PAM-N signaling and the data eye monitoring circuit comprises:

a histogram circuit coupled to the second signal processing stage, the histogram circuit having a plurality of different histograms for the PAM-N signaling, wherein the histogram circuit is configured to determine which histogram for the output of the second signal processing stage based on the symbol decision signal and the output of the second signal processing stage, and generate a histogram for the output of the second signal processing stage, and a computation circuit coupled to the histogram circuit, and configured to determine a data eye height and a data eye width based on the histogram from the histogram circuit to determine the data eye error rate.

10. A digital serializer/deserializer circuit for a receiver, the digital serializer/deserializer circuit comprising a data path and a data eye monitoring path, wherein:

the data path comprises:

a first analog-to-digital converter (ADC) configured to convert a received analog signal to first digital samples at a first sample rate;

a first signal processing stage coupled to the first ADC, the first signal processing stage comprising an equalizer coupled to the ADC for equalizing the first digital samples to generate a first equalized signal; and a decision circuit coupled to the first signal processing stage for generating a symbol decision signal from the first equalized signal; and the data eye monitoring path comprises:

a slicing circuit coupled to the first ADC and the first signal processing stage, and further configured to slice the received analog signal according to a slicer level to generate second digital samples at a second sample rate, wherein the slicer level is determined according to the first equalized signal and the first digital samples; and a data eye monitoring circuit coupled to the slicing circuit, and configured to determine a data eye error rate according to the symbol decision signal and the second digital samples, wherein the digital serializer/deserializer circuit further comprises:

a first digital-analog converter (DAC) coupled to the first ADC and the slicing circuit, and configured to convert the first digital samples into a first analog signal which is used to determine the slicer level;

a multiplier coupled to the first signal processing stage, for multiplying a reciprocal of a main tap coefficient of an FFE of the first signal processing stage with the first equalized signal to generate a multiplication result; and a second DAC coupled to the multiplier, for converting the multiplication result into a second analog signal which is used to determine the slicer level.

11. The digital serializer/deserializer circuit according to claim 10, wherein the equalizer comprises:

a feed-forward equalizer (FFE) coupled to the first ADC for filtering the first digital samples to generate a feed forward equalized signal;

a decision feedback equalizer (DFE) coupled to the decision circuit for processing the symbol decision signal to generate a decision feedback equalized signal; and a combining circuit coupled to the FFE and the DFE for combining the feed forward equalized signal and the decision feedback equalized signal to generate the first equalized signal.

12. The digital serializer/deserializer circuit according to claim 10, wherein the second digital samples are derived by the slicing circuit at second sampling points different from the first sampling points at which the first digital samples are derived, and the second sample rate is lower than the first sample rate.

13. A data eye monitoring method of a digital serializer/deserializer circuit for a receiver, the data eye monitoring method including:

converting a received analog signal to first digital samples at a first sample rate;

equalizing the first digital samples to generate a first equalized signal;

generating a symbol decision signal from the first equalized signal;

converting the received analog signal to second digital samples at a second sample rate, the second digital samples being sampled at second sampling points different from the first sampling points at which the first digital samples are sampled;

receiving the first digital samples prior to equalization of the first digital samples, determining a difference signal between the first digital samples and the second digital samples, and combining the first equalized signal and the difference signal to generate a signal processing output; and determining a data eye error rate according to the symbol decision signal and the signal processing output.

14. The data eye monitoring method according to claim 13, wherein the second sample rate is equal to or lower than the first sample rate;

equalizing the first digital samples to generate the first equalized signal includes:

filtering the first digital samples to generate a feed forward equalized signal;

processing the symbol decision signal to generate a decision feedback equalized signal; and combining the feed forward equalized signal and the decision feedback equalized signal to generate the first equalized signal.

15. The data eye monitoring method according to claim 13, wherein the signal processing output is represented by a formula $s[n]+w_0(y(nT+\tau)-y(nT))$, wherein: $s[n]$ represents the first equalized signal, $w_0$ is a weighting coefficient, $y(nT)$ represents the first digital samples which are samples of the received analog signal at times $nT$, $y(nT+\tau)$ represents the second digital samples which are samples of the received analog signal at times $nT+\tau$, $T$ is the sampling period, and $\tau$ is a time offset.

16. The data eye monitoring method according to claim 15, wherein the weighting coefficient is corresponding to a main tap coefficient of an FFE; or the main tap coefficient of the FFE is set as 1.

17. The data eye monitoring method according to claim 13, wherein the signal processing stage comprises two adders and one multiplier, wherein the multiplier is configured to multiply the difference signal by a weighting coefficient which is corresponding to a main tap coefficient of an FFE.

18. The data eye monitoring method according to claim 13, further comprising:

outputting slicing samples above a plurality of adjustable data eye thresholds; and determining the data eye error rate according to the symbol decision signal and the slicing samples.

19. The data eye monitoring method according to claim 13, wherein the received analog signal is of PAM-N signaling; and the data eye monitoring method further comprises:

determining which histogram for the signal processing output based on the symbol decision signal and the signal processing output, and generating a histogram for the signal processing output, and determining a data eye height and a data eye width based on the histogram to determine the data eye error rate.

* * * * *